US012775734B2

(12) United States Patent
Hamada

(10) Patent No.: US 12,775,734 B2
(45) Date of Patent: Oct. 27, 2026

(54) SECURE SEARCH SYSTEM, SECURE SEARCH APPARATUS, SECURE SEARCH METHOD, AND PROGRAM

(71) Applicant: NTT, Inc.

(72) Inventor: Koki Hamada, Tokyo (JP)

(73) Assignee: NTT, Inc., Tokyo (JP)

( * ) Notice: Subject to any disclaimer, the term of this patent is extended or adjusted under 35 U.S.C. 154(b) by 26 days.

(21) Appl. No.: 18/868,752

(22) PCT Filed: Jun. 1, 2022

(86) PCT No.: PCT/JP2022/022272
§ 371 (c)(1),
(2) Date: Nov. 24, 2024

(87) PCT Pub. No.: WO2023/233569
PCT Pub. Date: Dec. 7, 2023

(65) Prior Publication Data
US 2025/0348613 A1 Nov. 13, 2025

(51) Int. Cl.
*G06F 21/00* (2013.01)
*G06F 16/2455* (2019.01)
*G06F 21/62* (2013.01)

(52) U.S. Cl.
CPC ...... *G06F 21/6227* (2013.01); *G06F 16/2455* (2019.01)

(58) Field of Classification Search
CPC .......................... G06F 21/6227; G06F 16/2455
See application file for complete search history.

(56) References Cited

U.S. PATENT DOCUMENTS 7,937,270 B2 * 5/2011 Smaragdis .............. H04L 9/008 704/256
10,592,685 B2 * 3/2020 Yeo ....................... H04L 9/0631
(Continued)

FOREIGN PATENT DOCUMENTS

CN 111784078 * 10/2020 ....... G06F 18/24323
CN 119997121 A * 5/2025
WO WO-2019059042 A1 * 3/2019 ............. G06F 21/71

OTHER PUBLICATIONS

Blanton et al. (2021) "Binary Search in Secure Computation," IACR Cryptol. ePrint Arch.

*Primary Examiner* — Ghodrat Jamshidi

(57) ABSTRACT

Provided is a technique for computing confidential values of a first plurality of pieces of data satisfying predetermined search conditions from a sequence of confidential values of N pieces of aligned data and confidential values of a query. A vector decomposition means for computing a share $[[\vec{v}_i]]$ of a vector $\vec{v}_i$ ($i=1, \ldots \alpha$) having a length $\beta$ satisfying predetermined conditions from a share $[[\vec{v}]]$ of an aligned vector $\vec{v}$ having a length N, a first detection means for computing a share $[[\vec{f}]]$ of a vector $\vec{f}$ having a length $\alpha$ satisfying predetermined conditions from the share $[[\vec{v}_i]]$, a partial vector computation means for computing a share $[[\vec{a}]]$ of a vector $\vec{a}$ having a length $\beta\gamma$ satisfying predetermined conditions using the share $[[\vec{v}_i]]$ and the share $[[\vec{f}]]$, a second detection means for computing a share of $[[\vec{b}]]$ a vector $\vec{b}$ having a length $\beta$ satisfying predetermined conditions from the share $[[\vec{a}]]$, and an output computation means for computing a share of a search result vector from the share $[[\vec{a}]]$ using the share $[[\vec{b}]]$.

7 Claims, 4 Drawing Sheets

(56) References Cited

U.S. PATENT DOCUMENTS

| | | | | |
|---|---|---|---|---|
| 11,726,993 | B1 * | 8/2023 | Speers | G06F 16/2365 707/775 |
| 2015/0121545 | A1 * | 4/2015 | Chandrasekaran | G06F 16/2282 726/27 |
| 2019/0068374 | A1 * | 2/2019 | Veeningen | G06F 16/90344 |
| 2021/0133587 | A1 * | 5/2021 | Mohassel | H04L 9/085 |
| 2022/0060451 | A1 * | 2/2022 | Kashyap | H04L 63/062 |

* cited by examiner

SECURE SEARCH SYSTEM, SECURE SEARCH APPARATUS, SECURE SEARCH METHOD, AND PROGRAM

CROSS-REFERENCE TO RELATED APPLICATIONS

This application is a U.S. 371 Application of International Patent Application No. PCT/JP2022/022272, filed on 1 Jun. 2022, the disclosure of which is hereby incorporated herein by reference in its entirety.

TECHNICAL FIELD

The present invention relates to a secure computation technique, and more particularly, to a technique for computing confidential values of data satisfying predetermined search conditions from a sequence of confidential values of N pieces of aligned data and confidential values of a query.

BACKGROUND ART

Secure computation is a method of obtaining an operation result of a designated operation without restoring encrypted numerical values (refer to Reference Non Patent Literature 1, for example). In the method of Reference Non Patent Literature 1, encryption of distributing a plurality of pieces of information capable of restoring numerical values to three secure computation devices is performed, and results of addition/subtraction, constant addition, multiplication, constant multiplication, logical operations (negation, logical product, logical sum, exclusive logical sum), and data format conversion (integers and binary numbers) can be held in a state in which they are distributed to the three secure computation devices without restoring the numerical values, that is, in an encrypted state. In general, the number of distribution destinations is not limited to three and can be W (W is a predetermined constant of three or more), and a protocol that realizes secure computation by cooperative computation using W secure computation devices is called a multi-party protocol.

(Reference Non Patent Literature 1: Koji Chida, Koki Hamada, Dai Ikarashi, Katsumi Takahashi, "Keiryo kensho kano 3 party hitoku kansu keisan no saiko (in Japanese) (Reconsideration of lightweight verifiable three-party secure function computation)," In CSS, 2010.)

An example of a method of searching in secure computation is a method of computing confidential values of the first data that is equal to or larger than the value of a query from a sequence of confidential values of N pieces of data arranged in ascending order and confidential values of the query (refer to Non Patent Literature 1).

CITATION LIST

Non Patent Literature

Non Patent Literature 1: Marina Blanton and Chen Yuan, "Binary Search in Secure Computation," IACR Cryptol. ePrint Arch., 2021.

SUMMARY OF INVENTION

Technical Problem

However, with the above method, only the confidential values of the corresponding first data can be computed. That is, it is not possible to compute confidential values of the first plurality of pieces of data satisfying predetermined search conditions from a sequence of confidential values of N pieces of aligned data and the confidential values of the query.

Therefore, an object of the present invention is to provide a technique for computing confidential values of a first plurality of pieces of data satisfying predetermined search conditions from a sequence of confidential values of N pieces of aligned data and confidential values of a query.

Solution to Problem

One aspect of the present invention is a secure search system including three or more secure search devices and computing a share of a vector (hereinafter referred to as a search result vector) including K first elements satisfying search conditions regarding a query q among elements of a vector $\vec{v}$ from a share $[[\vec{v}]]$ of the aligned vector $\vec{v}$ having a length N and a share$[[q]]$ of the query q, wherein N is an integer of 1 or more and K is an integer of 2 or more, the secure search system including: a vector decomposition means for computing a share $[[\vec{v}_i]]$ of a vector $\vec{v}_i$ $(i=1, \ldots, \alpha)$ having a length $\beta$ (where $\vec{v}_1 \vec{v}_2 \ldots \vec{v}_\alpha = \vec{v}\vec{X}$ ($\vec{X}$ is a vector having a length $\alpha\beta-N$ in which all elements are dummy data X)) from the share $[[\vec{v}]]$, wherein $\alpha$ and $\beta$ are integers of 1 or more (where $\alpha$ and $\beta$ satisfy $\alpha\beta \geq N$); a first detection means for generating a share $[[\vec{u}]]$ of a vector $\vec{u}=(v_1(\beta), \ldots, \vec{v}_\alpha(\beta))$ having the length $\alpha$ from the share $[[\vec{v}_i]]$ $(i=1, \ldots, \alpha)$ and computing a share $[[\vec{f}]]$ of a vector $\vec{f}$ having the length $\alpha$ (where S is a number of a first element satisfying the search conditions regarding the query q among elements of the vector $\vec{u}$, and $\vec{f}$ is a vector in which the S-th element is 1 and the other elements are 0) from the share $[[\vec{u}]]$; a partial vector computation means for computing a share $[[\vec{a}]]$ of a vector $\vec{a}$ (where $\vec{a}=\vec{v}_S \vec{v}_{S+1} \ldots \vec{v}_{S+\gamma-1}$) having a length By using the share $[[\vec{v}_i]]$ $(i=1, \ldots, \alpha)$ and the share $[[\vec{f}]]$, wherein $\gamma$ is an integer of 1 or more (where $\gamma$ satisfies $1+(\gamma \rightarrow 1)\ \beta \geq K$); a second detection means for computing a share $[[\vec{b}]]$ of a vector $\vec{b}$ (where T is a number of a first element satisfying the search conditions regarding the query q among elements of the vector $\vec{a}$, and $\vec{b}$ is a vector in which the T-th element is 1 and the other elements are 0) having the length (from the share $[[\vec{a}]]$; and an output computation means for computing a share $[[\vec{c}]]$ of a vector $\vec{c}$ (where $\vec{v}(j)=X(j>N)$, and $\vec{c}=(\vec{v}((S \rightarrow 1)\beta+T), \vec{v}((S \rightarrow 1)\beta+T+1), \ldots, \vec{v}((S \rightarrow 1)\beta+T+K \rightarrow 1)))$ having the length K from the share $[[\vec{a}]]$ using the share $[[\vec{b}]]$, and setting the share $[[\vec{c}]]$ as a share of the search result vector.

Advantageous Effects of Invention

According to the present invention, it is possible to compute confidential values of the first plurality of pieces of data satisfying predetermined search conditions from a sequence of confidential values of N pieces of aligned data and confidential values of a query.

DESCRIPTION OF EMBODIMENTS

Figure 1:
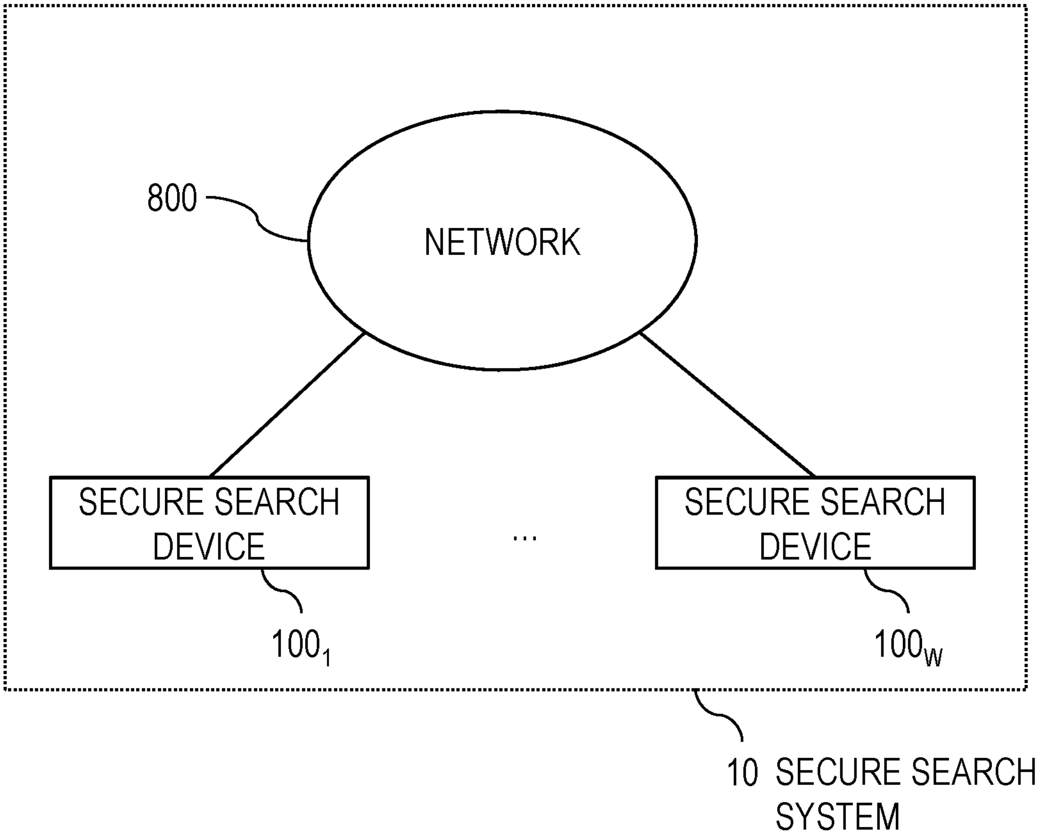
FIG. 1 is a block diagram illustrating a configuration of a secure search system 10.

Hereinafter, embodiments of the present invention will be described in detail. Note that components having the same function are denoted by the same reference numeral, and redundant description will be omitted.

Prior to the description of each embodiment, a notation method in this specification will be described.

^ (caret) represents a superscript. For example, $x^{y\hat{}z}$ represents that $y^z$ is a superscript for x, and $x_{y\hat{}z}$ represents that $y^z$ is a subscript for x. Furthermore, (underscore) represents a subscript. For example, $x^{y\_z}$ represents that $y_z$ is a superscript for x, and $x_{y\_z}$ represents that $y_z$ is a subscript for x.

A superscript "^" or "~" such as ^x or ~x for a certain character x would normally be placed directly above "x", but is written as ^x or ~x due to restrictions of notation in the specification.

TECHNICAL BACKGROUND

<<Secure Computation>>

Secure computation in the invention of the present application is constructed by a combination of existing secure computation operations. Operations necessary for this secure computation are, for example, concealment, addition, subtraction, multiplication, division, logical operations (negation, logical product, logical sum, exclusive logical sum), and comparison operation (=, <, >, ≤, ≥). Hereinafter, some operations and their notation will be described.

[Concealment]

It is assumed that is a value (hereinafter referred to as a share of x) obtained by concealing x through secure distribution. Any method can be used as a secure distribution method. For example, the Shamir secure distribution on $GF(2^{61}-1)$ and replicated secure distribution on $Z_2$ can be used. It is to be noted that because double brackets are typically used in patent amendments to delete the subject matter between the double brackets, the claims are written to use double parenthesis and instead of double brackets used throughout the specification. Therefore, double parenthesis within the claims mean the same as double brackets described herein.

A plurality of secure distribution methods may be used in combination in one algorithm. In this case, it is assumed that mutual conversion is appropriately performed.

For an N-dimensional vector $^{\rightarrow}x=(x_1, \ldots, x_N)$, $[[^{\rightarrow}x]]=([[x_1]], \ldots, [[^{\rightarrow}x_N]])$ is set. That is, $[[^{\rightarrow}x]]$ is a vector having the share $[[x_n]]$ of the n-th element $x_n$ of $^{\rightarrow}x$ as the n-th element.

Note that x is referred to as plaintext of [[x]].

As a method of obtaining [[x]] from x (concealment) and a method of obtaining x from [[x]] (restoration), specifically, there are methods described in Reference Non Patent Literature 1 and Reference Non Patent Literature 2.

(Referenced Non Patent Literature 2: Shamir, A., "How to share a secret", Communications of the ACM, Vol. 22, No. 11, pp. 612-613, 1979.)

[Addition, Subtraction, Multiplication, and Division]

Addition [[x]]+[[y]] by secure computation uses [[x]] and [[y]] as inputs and outputs [[x+y]]. Subtraction [[x]]−[[y]] by secure computation uses [[x]] and [[y]] as inputs and outputs [[x−y]]. Multiplication [[x]]×[[y]] (sometimes represented as mul([[x]], [[y]])) by secure computation uses [[x]] and [[y]] as inputs and outputs [[x×y]]. Division [[x]]/[[y]] (sometimes represented as div([[x]], [[y]])) by secure computation uses [[x]] and [[y]] as inputs and outputs [[x/y]].

As specific methods of addition, subtraction, multiplication, and division, there are methods described in Reference Non Patent Literature 3 and Reference Non Patent Literature 4.

(Referenced Non Patent Literature 3: Ben-Or, M., Goldwasser, S. and Wigderson, A., "Completeness theorems for non-cryptographic fault-tolerant distributed computation", Proceedings of the twentieth annual ACM symposium on Theory of computing, ACM, pp. 1-10, 1988.)

(Referenced Non Patent Literature 4: Gennaro, R., Rabin, M. O. and Rabin, T., "Simplied VSS and fast-track multiparty computations with applications to threshold cryptography", Proceedings of the seventeenth annual ACM symposium on Principles of distributed computing, ACM, pp. 101-111, 1998.)

[Logical Operation]

Negation not [[x]] by secure computation uses [[x]] as an input and outputs [[not (x)]]. Logical product and ([[x]], [[y]]) by secure computation uses [[x]] and [[y]] as inputs and outputs [[and (x, y)]]. Logical sum or ([[x]], [[y]]) by secure computation uses [[x]] and [[y]] as inputs and outputs [[or (x, y)]]. Exclusive logical sum xor([[x]], [[y]]) by secure computation uses [[x]] and [[y]] as inputs and outputs [[xor(x, y)]].

Note that logical operations can be easily configured by combining addition, subtraction, multiplication, and division.

[Comparison Operation]

Equal sign determination=([[x]], [[y]]) (sometimes represented as equal([[x]], [[y]])) by secure computation uses [[x]] and [[y]] as inputs, outputs [[1]] in a case where x=y, and outputs [[0]] otherwise. Comparison <([[x]], [[y]]) by secure computation uses [[x]] and [[y]] as inputs, outputs [[1]] in a case where x<y, and outputs [[0]] otherwise. Comparison >([[x]], [[y]]) by secure computation uses [[x]] and [[y]] as inputs, outputs [[1]] in a case where x>y, and outputs [[0]] otherwise. Comparison ≤([[x]], [[y]]) by secure computation uses [[x]] and [[y]] as inputs, outputs [[1]] in a case where x≤y, and outputs [[0]] otherwise. Comparison ≥([[x]], [[y]]) by secure computation uses [[x]] and [[y]] as inputs, outputs [[1]] in a case where x≥y, and outputs [[0]] otherwise.

Note that comparison operations can be easily configured by combining logical operations.

<<Supplementary Explanation on Vector>>

Alignment of N-dimensional vectors $^{\rightarrow}x=(x_1, \ldots, x_N)$ with respect to an order relation R means that $x_n R x_{n+1}$ $(n=1, \ldots, n^{\rightarrow}1)$ is established. As a specific example of the order relation R, for example, there is a normal comparison operation such as ≤ or ≥. The N-dimensional vectors $^{\rightarrow}x=(x_1, \ldots x_N)$ are said to be aligned in ascending order in a case in which the order relation R is ≤ or <, and the N-dimensional vectors $^{\rightarrow}x=(x_1, \ldots, x_N)$ are said to be aligned in descending order in a case in which the order relation R is ≥ or >.

For N-dimensional vectors $^{\rightarrow}x=(x_1, \ldots, x_N)$ and M-dimensional vectors $^{\rightarrow}y=(y_1, \ldots, y_M)$, an (N+M)-dimensional vector $^{\rightarrow}x^{\rightarrow}y$ is set as $^{\rightarrow}x^{\rightarrow}y=(x_1, \ldots, x_N, y_1, \ldots, y_M)$, and a vector $^{\rightarrow}x^{\rightarrow}y$ is referred to as a connected vector of a vector $^{\rightarrow}x$ and a vector $^{\rightarrow}y$.

In addition, for N-dimensional vectors $\vec{x}=(x_1, \ldots, x_N)$ and N-dimensional vectors $\vec{y}=(y_1, \ldots, y_N)$, an inner product of a vector $\vec{x}$ and a vector $\vec{y}$ is represented as $\vec{x}*\vec{y}$.

Note that, hereinafter, an N-dimensional vector $\vec{x}$ may be represented as $\vec{x}=(x(1), \ldots, x(N))$ instead of $\vec{x}=(x_1, \ldots, x_N)$.

First Embodiment

Figure 2:
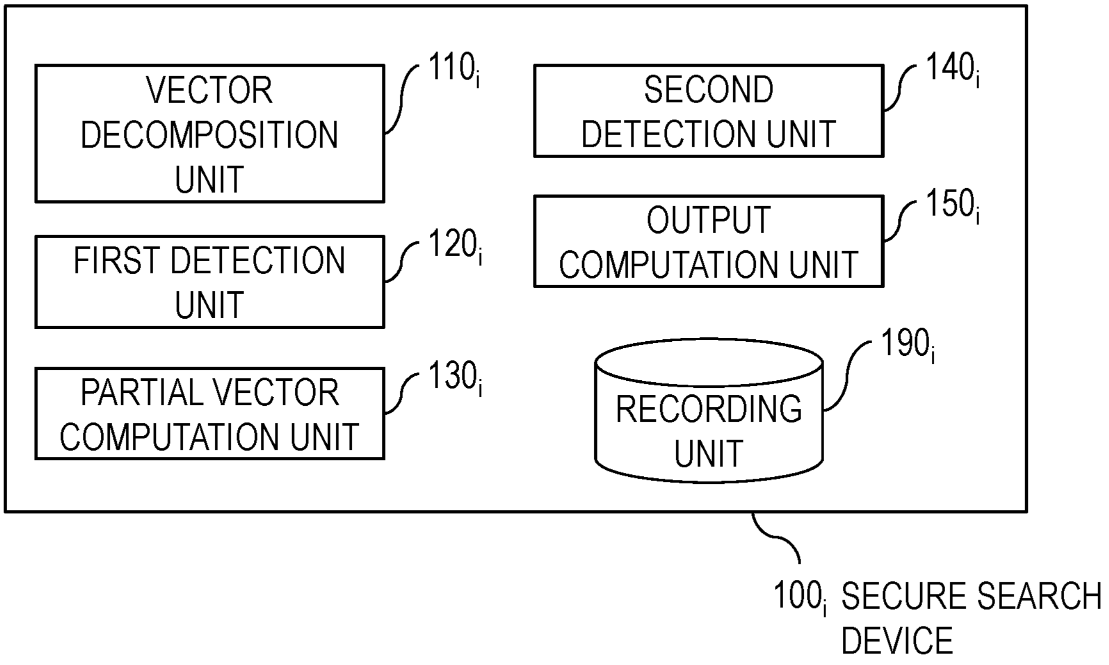
FIG. 2 is a block diagram illustrating a configuration of a secure search device 100$_i$.
Figure 3:
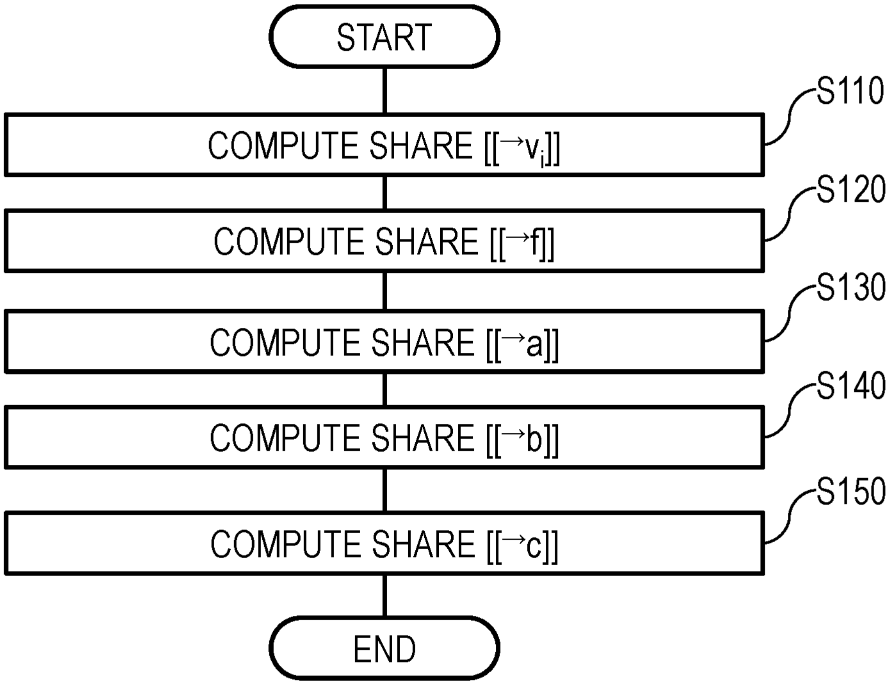
FIG. 3 is a flowchart illustrating an operation of the secure search system 10.

The secure search system 10 will be described below with reference to FIGS. 1 to 3. FIG. 1 is a block diagram illustrating a configuration of the secure search system 10. The secure search system 10 includes W (W is a predetermined integer of 3 or more) secure search devices $\mathbf{100}_1, \ldots, \mathbf{100}_W$. The secure search devices $\mathbf{100}_1, \ldots, \mathbf{100}_W$ are connected to a network 800 and can communicate with each other. The network 800 may be, for example, a communication network such as the Internet, a broadcast channel, or the like. FIG. 2 is a block diagram illustrating a configuration of a secure search device $\mathbf{100}_i$ ($1 \le i \le W$). FIG. 3 is a flowchart illustrating an operation of the secure search system 10.

As illustrated in FIG. 2, the secure search device $\mathbf{100}_i$ includes a vector decomposition unit 110*i*, a first detection unit $\mathbf{120}_i$, a partial vector computation unit $\mathbf{130}_i$, a second detection unit $\mathbf{140}_i$, an output computation unit $\mathbf{150}_i$, and a recording unit $\mathbf{190}_i$. Each component of the secure search device $\mathbf{100}_i$ except for the recording unit $\mathbf{190}_i$ is configured to be able to execute operations required for secure computation, that is, operations required for realizing the function of each component among at least concealment, addition, subtraction, multiplication, division, logical operations, and comparison operations. As a specific functional configuration for realizing each operation in the present invention, for example, a configuration capable of executing existing algorithms including the algorithms disclosed in each of Reference Non Patent Literature 1 to 4 is sufficient, and since these are conventional configurations, a detailed description thereof will be omitted. Further, the recording unit $\mathbf{190}_i$ is a component that records information necessary for processing of the secure search device $\mathbf{100}_i$.

Through cooperative computation by the W secure search devices $\mathbf{100}_i$, the secure search system 10 realizes secure computation of search, which is a multi-party protocol. Therefore, a vector decomposition means 110 (not illustrated) of the secure search system 10 includes vector decomposition units $\mathbf{110}_1, \ldots \mathbf{110}_W$, a first detection means 120 (not illustrated) includes first detection units $\mathbf{120}_1, \ldots \mathbf{120}_W$, a partial vector computation means 130 (not illustrated) includes partial vector computation units $\mathbf{130}_1, \ldots, \mathbf{130}_W$, a second detection means 140 (not illustrated) includes second detection units $\mathbf{140}_1, \ldots \mathbf{140}_W$, and an output computation means 150 (not illustrated) includes output computation units $\mathbf{150}_1, \ldots, \mathbf{150}_W$.

The secure search system 10, assuming that N is an integer of 1 or more and K is an integer of 2 or more, computes a share of a vector (hereinafter referred to as a search result vector) including K first elements satisfying search conditions regarding a query q among elements of a vector $\vec{v}$ from a share $[[\vec{v}]]$ of the aligned vector $\vec{v}$ of a length N and a share [[q]] of the query q. Here, it is assumed that the search conditions regarding the query q are search conditions of q or more or search conditions of greater than q in a case in which the vector $\vec{v}$ is aligned in ascending order, and search conditions of q or less or search conditions of smaller than q in a case in which the vector $\vec{v}$ is aligned in descending order. That is, as for the search conditions regarding the aligned vector $\vec{v}$ and the query q, in a case in which a j-th element $\vec{v}(j)$ ($j<N$) of the vector $\vec{v}$ satisfies the search conditions regarding the query q, a (j+1)-th element $\vec{v}(j+1)$ of the vector $\vec{v}$ also satisfies the search conditions regarding the query q. Note that the share $[[\vec{v}]]$ and the share [[q]] may be recorded in the recording unit $\mathbf{190}_i$ in advance.

Hereinafter, the operation of the secure search system 10 will be described with reference to FIG. 3.

In S110, the vector decomposition means 110, assuming that α and β are integers of 1 or more (where α and (satisfy $\alpha\beta \ge N$), computes a share $[[\vec{v}_i]]$ of a vector $\vec{v}_i$ ($i=1, \ldots, \alpha$) having the length β (where $\vec{v}_1 \vec{v}_2 \ldots, \vec{v}_\alpha = \vec{v}\vec{X}$ ($\vec{X}$ is a vector having a length $\alpha\beta - N$ in which all elements are dummy data X)) from the share $[[\vec{v}]]$. Note that the share [[X]] of the dummy data X is [[X]]=X. For convenience, it is assumed that $\vec{v}_i$ ($i>\alpha$) is a vector having a length β in which all elements are dummy data X.

In S120, the first detection means 120 generates a share $[[\vec{u}]]$ of a vector $\vec{u}=(\vec{v}_1(\beta), \ldots, \vec{v}_\alpha(\beta))$ having the length α from the share $[[\vec{v}_i]]$ ($i=1, \ldots, \alpha$) computed in S110, and computes a share $[[\vec{f}]]$ of a vector of having the length α (where S is a number of a first element satisfying the search conditions regarding the query q among the elements of the vector $\vec{u}$, and $\vec{f}$ is a vector in which the S-th element is 1 and the other elements are 0) from the share $[[\vec{u}]]$. In a case in which the vector $\vec{v}$ is aligned in ascending order, for example, the first detection means 120 can compute a share $[[\vec{g}]]$ of a vector $\vec{g}$ according to $[[\vec{g}(j)]]=\ge([[\vec{u}(j)]], [[q]])$ or $[[\vec{g}(j)]]=>([[\vec{u}(j)]], [[q]])$ for the j-th element $[[\vec{u}(j)]]$ of the share $[[\vec{u}]]$, and further compute the share $[[\vec{f}]]$ of the vector $\vec{f}$ according to $[[\vec{f}(1)]]=[[\vec{g}(1)]$ and $[[\vec{f}(j)]]=[[\text{and}(\vec{g}(j), \text{not}(\vec{g}(j-1)))]]$ ($j>1$). Similarly, in a case in which the vector $\vec{v}$ is aligned in descending order, for example, the first detection means 120 can compute the share $[[\vec{g}]]$ of the vector $\vec{g}$ according to $[[\vec{g}(j)]]=\le([[\vec{u}(j)]], [[q]])$ or $[[\vec{g}(j)]]=<([[u(j)]], [[q]])$ for the j-th element $[[\vec{u}(j)]]$ of the share $[[\vec{u}]]$, and further compute the share $[[\vec{f}]]$ of the vector $\vec{f}$ according to $[[\vec{f}(1)]]=[[\vec{g}(1)]$ and $[[\vec{f}(j)]]=[[\text{and}(\vec{g}(j), \text{not}(\vec{g}(j-1)))]]$ ($j>1$).

In S130, the partial vector computation means 130, assuming that γ is an integer of 1 or more (where γ satisfies $1+(\gamma \rightarrow 1)\beta \ge K$.), computes a share $[[\vec{a}]]$ of a vector $\vec{a}$ (where $\vec{a}=\vec{v}_S \vec{v}_{S+1} \ldots \vec{v}_{S+\gamma-1}$) having a length βγ using the share $[[\vec{v}]]$ ($i=1, \ldots, \alpha$) computed in S110 and the share $[[\vec{f}]]$ computed in S120. For example, the partial vector computation means 130 computes a share $[[\vec{y}_i]]$ ($i=1, \ldots, \gamma$) of a vector $\vec{y}_i$ having the length β by setting $[[\vec{y}_i(j)]]=[[(\vec{v}_i(j), \vec{v}_{i+\alpha-1}(j))*\vec{f}]]$ ($j=1, \ldots, \beta$) from a share $[[(\vec{v}_i(j), \ldots, \vec{v}_{i+\alpha-1}(j))]]$ of a vector $(\vec{v}_i(j), \ldots, \vec{v}_{i+\alpha-1}(j))$ ($j=1, \ldots, \beta$) and the share $[[\vec{f}]]$, and computes the share $[[\vec{a}]]$ by setting $\vec{a}=\vec{y}_1\vec{y}_2 \ldots \vec{y}_\gamma$ from the share $[[\vec{y}_i]]$ ($i=1, \ldots, \gamma$). Here, it is assumed that $\vec{v}(j)=X(j>N)$. In addition, $\vec{y}_i=\vec{v}_{S+1-1}$ ($i=1, \ldots, \gamma$), and $\vec{a}=\vec{v}_S \vec{v}_{S+1} \ldots \vec{v}_{S+\gamma-1}$.

In S140, the second detection means 140 computes a share $[[\vec{b}]]$ of a vector $\vec{b}$ having the length β (where T is a number of a first element satisfying the search conditions regarding the query q among the elements of the vector $\vec{a}$, and $\vec{b}$ is a vector in which the T-th element is 1 and the other elements are 0) from the share $[[\vec{a}]]$ computed in S130. In a case in which the vector $\vec{v}$ is aligned in ascending order, for example, the second detection means 140 can compute the share $[[\vec{b}]]$ by computing $\ge([[\vec{a}(j)]], [[q]])$ or $>([[\vec{a}(j)]], [[q]])$ for the j-th element $[[\vec{a}(j)]]$ of the share [[→a]]. Similarly, in a case where the vectors v is aligned in descending order, for example, the second detection means 140 can compute the share [[→b]] by computing ≤([[→a(j)]], [[q]]) or <([[→a(j)]], [[q]]) for the j-th element [[→a(j)]] of the share [[→a]].

Note that the length of the vector →b can be β because the vector →$v_S$ necessarily includes an element that satisfies the search conditions regarding the query q, so that T satisfies 1≤T≤β.

In S150, the output computation means 150 computes a share [[→c]] of a vector →c having a length K (where →c=(→v((S→1)β+T), →v((S→1)β+T+1), . . . →v((S→1)β+T+K→1))) from the share [[→a]] computed in S130 using the share [[→b]] computed in S140, and sets the share [[→c]] as the share of the search result vector. For example, the output computation means 150 computes the share [[→c]] by setting [[→c (j)]]=[[(→$d_j$(1), . . . , →$d_j$(B))*→b]] (j=1, . . . , K) from a share [[(→$d_j$(1), . . . , $d_j$(β))]] of a vector including elements from the first element to the β-th element of a vector →$d_j$=(→a(j), . . . , a(βγ), X, . . . , X) (j=1, . . . , K) having a length βγ and the share [[→b]].

According to the embodiment of the present invention, it is possible to compute confidential values of a first plurality of pieces of data satisfying predetermined search conditions from a sequence of confidential values of N pieces of aligned data and confidential values of a query.

<Supplement>

Figure 4:
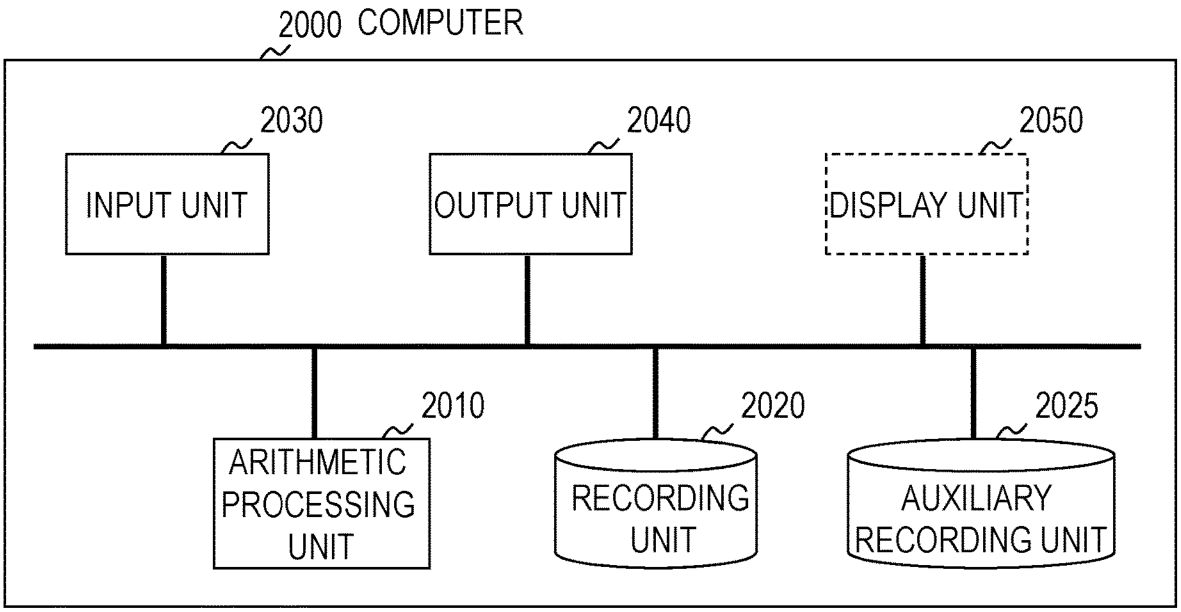
FIG. 4 is a diagram illustrating an example of a functional configuration of a computer that realizes each device in an embodiment of the present invention.

Processing of each unit of each device described above may be implemented by a computer, and in this case, details of processing of a function that each device should have is written by a program. Then, by causing the recording unit 2020 of the computer 2000 illustrated in FIG. 4 to read this program and operating an arithmetic processing unit 2010, an input unit 2030, an output unit 2040, an auxiliary recording unit 2025, and the like, various processing functions in each device described above are realized on the computer.

The device of the present invention includes, for example, as a single hardware entity, an input unit to which a signal can be input from the outside of the hardware entity, an output unit through which a signal can be output to the outside of the hardware entity, a communication unit to which a communication device (for example, a communication cable) capable of communicating with the outside of the hardware entity can be connected, a CPU (Central Processing Unit which may include a cache memory, a register, and the like) which is an arithmetic processing unit, a RAM and a ROM which are memories, an external storage device which is a hard disk, and a bus connected such that the input unit, the output unit, the communication unit, the CPU, the RAM, the ROM, and the external storage device can exchange data. Furthermore, if necessary, a device (drive) or the like that can read and write a recording medium such as a CD-ROM may be provided in the hardware entity. Examples of a physical entity including such hardware resources include a general-purpose computer and the like.

The external storage device of the hardware entity stores a program necessary for realizing the above-described functions, data necessary for processing of the program, and the like (the present invention is not limited to the external storage device, for example, the program may be stored in a ROM that is a read-only storage device). In addition, data or the like obtained by processing of such a program is appropriately stored in a RAM, an external storage device, or the like.

In the hardware entity, each program stored in the external storage device (or ROM or the like) and data necessary for processing of each program are read into a memory as necessary, and interpreted and executed by a CPU as appropriate. As a result, the CPU realizes a predetermined function (each component represented as the above . . . unit, . . . means, and the like). That is, each component of the embodiment of the present invention may be configured by processing circuitry.

As described above, in a case in which the processing function in the hardware entity (the device of the present invention) described in the above embodiment is realized by a computer, details of processing of the function that the hardware entity should have is written by a program. Then, by executing this program on a computer, the processing function in the hardware entity is realized on the computer.

The program in which details of processing are written can be recorded in a computer-readable recording medium. The computer-readable recording medium is, for example, a non-transitory recording medium, and is specifically a magnetic recording device, an optical disk, or the like.

Furthermore, distribution of the program is performed by, for example, selling, transferring, or renting a portable recording medium such as a DVD or a CD-ROM in which the program is recorded. Furthermore, the program may be stored in a storage device of a server computer, and the program may be distributed by transferring the program from the server computer to another computer via a network.

For example, the computer that executes such a program first temporarily stores the program recorded in the portable recording medium or the program transferred from the server computer in the auxiliary recording unit 2025 that is its own non-transitory storage device. Then, at the time of executing the processing, the computer reads the program stored in the auxiliary recording unit 2025, which is its own non-transitory storage device, into the recording unit 2020, and executes the processing according to the read program. In addition, as another embodiment of the program, the computer may directly read the program from the portable recording medium into the recording unit 2020 and execute processing according to the program, and furthermore, the computer may sequentially execute processing according to the received program each time the program is transferred from the server computer to the computer. Moreover, the above-described processing may be executed by a so-called ASP (Application Service Provider) type service that implements a processing function only by an execution instruction and result acquisition without transferring the program from a server computer to the computer. Note that the program in the present embodiment includes information used for processing by an electronic computer and equivalent to the program (data or the like that is not a direct command to the computer but has a property that defines processing of the computer).

In this embodiment, the present device is configured by executing a predetermined program on a computer, but at least a part of the processing contents may be realized in hardware.

The present invention is not limited to the above-described embodiments, and can be appropriately modified without departing from the gist of the present invention.

The invention claimed is:

1. A secure search system comprising:

three or more secure search devices for cooperatively computing respective shares of –a search result vector including K first elements satisfying search conditions regarding a query q among elements of a vector →v from a share ((→v)) of the aligned vector →v having a length N and a share ((q)) of the query q, wherein a share of the search result vector represents an encrypted value obtained by concealing the search result vector through secure distribution to securely compute the search result vector among the three or more secure search devices cooperatively without restoring the encrypted value, N is an integer of 1 or more and K is an integer of 2 or more, and a respective secure search device of the three or more secure search devices of the secure search system comprises a processor configured to perform operations comprising:

a vector decomposition circuitry for computing a share $((\vec{v}_i))$ of a vector $\vec{v}_i$ $(i=1, \ldots, \alpha)$ having a length $\beta$ (where $\vec{v}_1\vec{v}_2 \ldots \vec{v}_\alpha=\vec{v}\vec{X}$ ($\vec{X}$ is a vector having a length $\alpha\beta-N$ in which all elements are dummy data X)) from the share $((\vec{v}))$, wherein $\alpha$ and $\beta$ are integers of 1 or more (where $\alpha$ and $\beta$ satisfy $\alpha\beta \geq N$);

a first detection circuitry for generating a share $((\vec{u}))$ of a vector $\vec{u}=(\vec{v}_1(\beta), \ldots, \vec{v}_\alpha(\beta))$ having the length a from the share $((\vec{v}_i))$ $(i=1, \ldots, \alpha)$ and computing a share $((\vec{f}))$ of a vector $\vec{f}$ having the length $\alpha$ (where S is a number of a first element satisfying the search conditions regarding the query q among elements of the vector $\vec{u}$, and $\vec{f}$ is a vector in which the S-th element is 1 and the other elements are 0) from the share $((\vec{u}))$;

a partial vector computation circuitry for computing a share $((\vec{a}))$ of a vector $\vec{a}$ (where $\vec{a}=\vec{v}_S\vec{v}_{S+1} \ldots \vec{v}_{S+\gamma-1}$) having a length $\beta\gamma$ using the share $((\vec{v}_i))$ $(i=1, \ldots, \alpha)$ and the share $(((\vec{f}))$, wherein $\gamma$ is an integer of 1 or more (where $\gamma$ satisfies $1+(\gamma-1)\beta \geq K$);

a second detection circuitry for computing a share $((\vec{b}))$ of a vector $\vec{b}$ (where T is a number of a first element satisfying the search conditions regarding the query q among elements of the vector $\vec{a}$, and $\vec{b}$ is a vector in which the T-th element is 1 and the other elements are 0) having the length $\beta$ from the share $(((\vec{a}))$; and an output computation circuitry for computing a share $((\vec{c}))$ of a vector $\vec{c}$ (where $\vec{v}(j)=X(j>N)$, and $\vec{c}=(\vec{v}((S-1)\beta+T), \vec{v}((S-1)\beta+T+1), \ldots, \vec{v}((S-1)\beta+T+K-1)))$ having the length K from the share $((\vec{a}))$ using the share $((\vec{b}))$, and setting the share $((\vec{c}))$ as a share of the search result vector.

2. The secure search system according to claim 1, wherein the partial vector computation circuitry computes a share $((\vec{y}_i))$ $(i=1, \ldots, \gamma)$ of a vector $\vec{y}_i$ having the length $\beta$ by setting $(\vec{y}_i(j)))=(\vec{v}_i(j), \ldots, \vec{v}_{i+\alpha-1}(j))^*\vec{f}))$ $(j=1, \ldots, \beta)$ from a share $(((\vec{v}_i(j), \ldots, \vec{v}_{i+\alpha-1}(j))))$ of a vector $(\vec{v}_i(j), \ldots, \vec{v}_{i+\alpha-1}(j))$ $(j=1, \ldots, \beta)$ and the share $((\vec{f}))$, and computes the share $((\vec{a}))$ by setting $\vec{a}=\vec{y}_1\vec{y}_2 \ldots \vec{y}_\gamma$ from the share $((\vec{y}_i))$ $(i=1, \ldots, \gamma)$.

3. The secure search system according to claim 1, wherein the output computation circuitry computes the share $((\vec{c}))$ by setting $((\vec{c}(j)))=(((\vec{d}_j(1), \ldots, \vec{d}_j(\beta)^*\vec{b}))$ $(j=1, \ldots, K)$ from a share $(((\vec{d}_j(1), \ldots, \vec{d}_j(\beta))))$ of a vector including elements from a first element to a $\beta$-th element of a vector $\vec{d}_j=(\vec{a}(j), \ldots, \vec{a}(\beta\gamma), X, \ldots, X)$ $(j=1, \ldots, K)$ having a length $\beta\gamma$ and the share $((\vec{b}))$.

4. The secure search system according to claim 1, wherein the search conditions regarding the query q are search conditions of q or more or search conditions of greater than q in a case in which the vector $\vec{v}$ is aligned in ascending order, and search conditions of q or less or search conditions of smaller than q in a case in which the vector $\vec{v}$ is aligned in descending order.

5. A secure search device in a secure search system comprising three or more secure search devices for cooperatively computing respective shares of a search result vector including K first elements satisfying search conditions regarding a query q among elements of a vector $\vec{v}$ from a share $((\vec{v}))$ of the aligned vector $\vec{v}$ having a length N and a share ((q)) of the query q, wherein a share of the search result vector represents an encrypted value obtained by concealing the search result vector through secure distribution to securely compute the search result vector among the three or more secure search devices cooperatively without restoring the encrypted value, N is an integer of 1 or more and K is an integer of 2 or more, and a respective secure search device of the three or more secure search devices of the secure search device comprises a processor configured to perform operations comprising:

a vector decomposition circuitry that computes a share $((\vec{v}_i))$ of a vector $\vec{v}_i$ $(i=1, \ldots, \alpha)$ having a length $\beta$ (where $\vec{v}_1\vec{v}_2 \ldots \vec{v}_\alpha=\vec{v}\vec{X}$ ($\vec{X}$ is a vector having a length $\alpha\beta-N$ in which all elements are dummy data X)) from the share $((\vec{v}))$, wherein $\alpha$ and $\beta$ are integers of 1 or more (where $\alpha$ and $\beta$ satisfy $\alpha\beta \geq N$);

a first detection circuitry that generates a share $((\vec{u}))$ of a vector $\vec{u}=(\vec{v}_1(\beta), \ldots, \vec{v}_\alpha(\beta))$ having the length a from the share $((\vec{v}_i))$ $(i=1, \ldots, \alpha)$ and computes a share $((\vec{f}))$ of a vector $\vec{f}$ having the length $\alpha$ (where S is a number of a first element satisfying the search conditions regarding the query q among elements of the vector $\vec{u}$, and $\vec{f}$ is a vector in which the S-th element is 1 and the other elements are 0) from the share $((\vec{u}))$;

a partial vector computation circuitry that computes a share $((\vec{a}))$ of a vector $\vec{a}$ (where $\vec{a}=\vec{v}_S\vec{v}_{S+1} \ldots \vec{v}_{S+\gamma-1}$) having a length $\beta\gamma$ using the share $((\vec{v}_i))$ $(i=1, \ldots, \alpha)$ and the share $((\vec{f}))$, wherein $\gamma$ is an integer of 1 or more (where $\gamma$ satisfies $1+(\gamma-1)\beta \geq K$);

a second detection circuitry that computes a share $((\vec{b}))$ of a vector $\vec{b}$ (where T is a number of a first element satisfying the search conditions regarding the query q among elements of the vector $\vec{a}$, and $\vec{b}$ is a vector in which the T-th element is 1 and the other elements are 0) having the length $\beta$ from the share $((\vec{a}))$; and an output computation circuitry that computes a share $((\vec{c}))$ of a vector $\vec{c}$ (where $\vec{v}(j)=X(j>N)$, and $\vec{c}=(\vec{v}((S-1)\beta+T), \vec{v}((S-1)\beta+T+1), \ldots, \vec{v}((S-1)\beta+T+K-1)))$ having the length K from the share $((\vec{a}))$ using the share $((\vec{b}))$, and sets the share $((\vec{c}))$ as a share of the search result vector.

6. A secure search method performed by a secure search system comprising three or more secure search devices that cooperatively compute respective shares of a search result vector including K first elements satisfying search conditions regarding a query q among elements of a vector $\vec{v}$ from a share $(\vec{v}))$ of the aligned vector $\vec{v}$ having a length N and a share ((q)) of the query q, wherein a share of the search result vector represents an encrypted value obtained by concealing the search result vector through secure distribution to securely compute the search result vector among the three or more secure search devices cooperatively without restoring the encrypted value, N is an integer of 1 or more and K is an integer of 2 or more, and the secure search method as performed by a processor of a respective secure search device of the three or more secure search devices of the secure search system comprising:

a vector decomposition step in which the secure search system computes a share $((\vec{v}_i))$ of a vector $\vec{v}_i$ ($i=1, \ldots, \alpha$) having a length $\beta$ (where $\vec{v}_1 \vec{v}_2 \ldots \vec{v}_\alpha = \vec{v}\vec{X}$ ($\vec{X}$ is a vector having a length $\alpha\beta-N$ in which all elements are dummy data X)) from the share $((\vec{v}))$, wherein $\alpha$ and $\beta$ are integers of 1 or more (where $\alpha$ and $\beta$ satisfy $\alpha\beta \geq N$);

a first detection step in which the secure search system generates a share $((\vec{u}))$ of a vector $\vec{u}=(\vec{v}_1(\beta), \ldots, \vec{v}_\alpha(\beta))$ having the length a from the share $((\vec{v}_i))$ ($i=1, \ldots, \alpha$) and computes a share $((\vec{f}))$ of a vector $\vec{f}$ having the length $\alpha$ (where S is a number of a first element satisfying the search conditions regarding the query q among elements of the vector $\vec{u}$, and $\vec{f}$ is a vector in which the S-th element is 1 and the other elements are 0) from the share $((\vec{u}))$;

a partial vector computation step in which the secure search system computes a share $((\vec{a}))$ of a vector $\vec{a}$ (where $\vec{a}=\vec{v}_S\vec{v}_{S+1} \ldots \vec{v}_{S+\gamma-1}$) having a length $\beta\gamma$ using the share $((\vec{v}_i))$ ($i=1, \ldots, \alpha$) and the share $((\vec{f}))$, wherein $\gamma$ is an integer of 1 or more (where $\gamma$ satisfies $1+(\gamma-1)\beta \geq K$);

a second detection step in which the secure search system computes a share $((\vec{b}))$ of a vector $\vec{b}$ (where T is a number of a first element satisfying the search conditions regarding the query q among elements of the vector $\vec{a}$, and $\vec{b}$ is a vector in which the T-th element is 1 and the other elements are 0) having the length $\beta$ from the share $((\vec{a}))$; and an output computation step in which the secure search system computes a share $((\vec{c}))$ of a vector $\vec{c}$ (where $\vec{v}(j)=X(j>N)$, and $\vec{c}=(\vec{v}((S-1)\beta+T), \vec{v}((S-1)\beta+T+1), \ldots, \vec{v}((S-1)\beta+T+K-1)))$ having the length K from the share $((\vec{a}))$ using the share $((\vec{b}))$, and sets the share $((\vec{c}))$ as a share of the search result vector.

7. A non-transitory computer-readable storage medium which stores a program for causing a computer to function as the secure search device according to claim 5.

* * * * *